(No Model.)

R. HARDING.
COMBINED BAND CUTTER AND FEEDER FOR THRASHING MACHINES.

No. 310,679. Patented Jan. 13, 1885.

WITNESSES:
Chas. Nida
C. Sedgwick

INVENTOR:
R. Harding
BY Munn & Co.
ATTORNEYS.

UNITED STATES PATENT OFFICE.

RICHARD HARDING, OF McGAHEYSVILLE, VIRGINIA, ASSIGNOR OF ONE-HALF TO IRENAEUS CONDER, OF SAME PLACE.

COMBINED BAND-CUTTER AND FEEDER FOR THRASHING-MACHINES.

SPECIFICATION forming part of Letters Patent No. 310,679, dated January 13, 1885.

Application filed May 5, 1884. (No model.)

*To all whom it may concern:*

Be it known that I, RICHARD HARDING, of McGaheysville, in the county of Rockingham and State of Virginia, have invented a new and useful Improvement in Combined Band-Cutters and Feeders for Thrashing-Machines, of which the following is a full, clear, and exact description.

Reference is to be had to the accompanying drawings, forming part of this specification, in which similar letters of reference indicate corresponding parts in all the figures.

Figure 1:
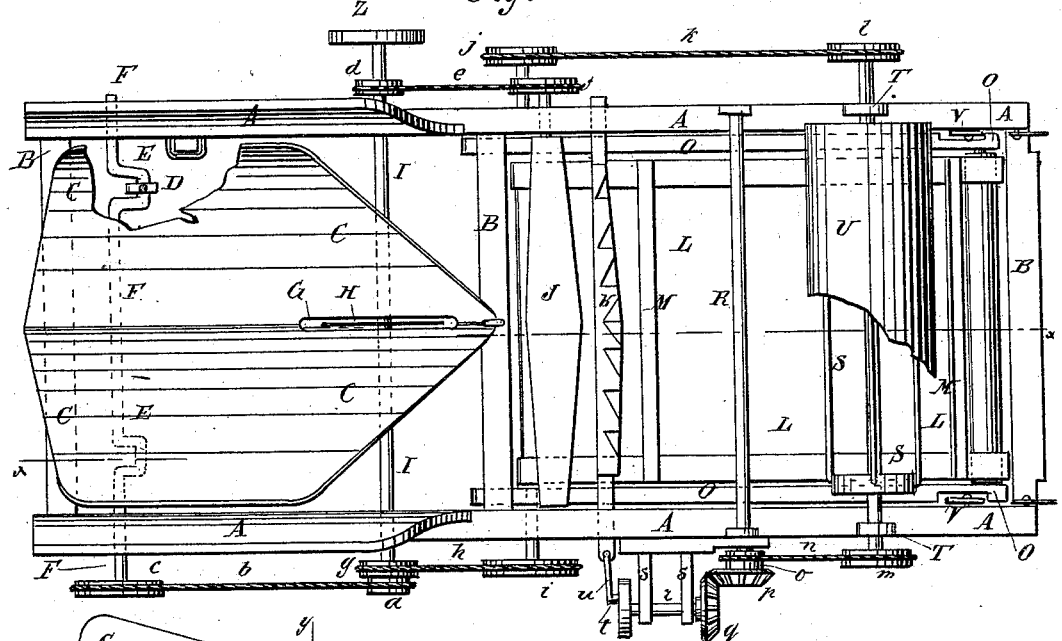
Figure 2:
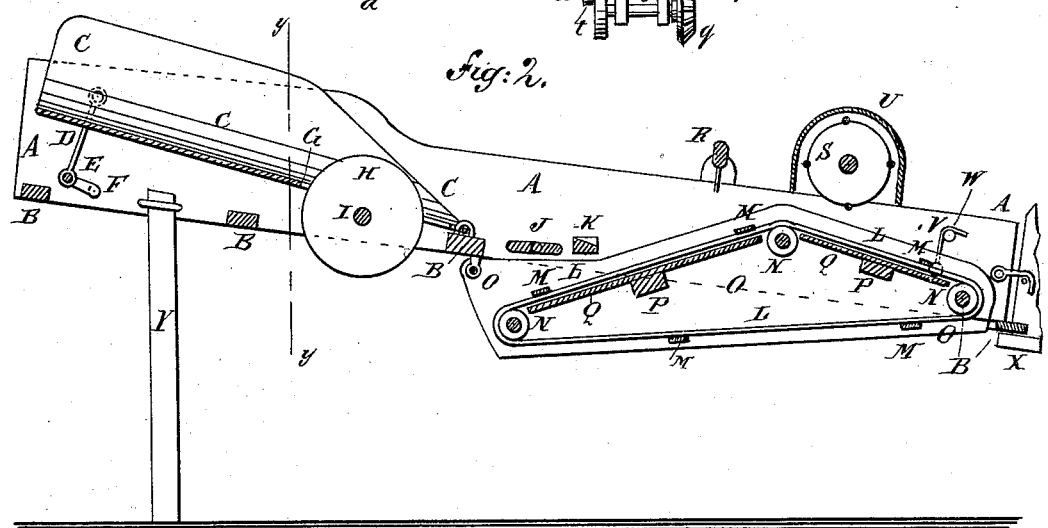
Figure 3:
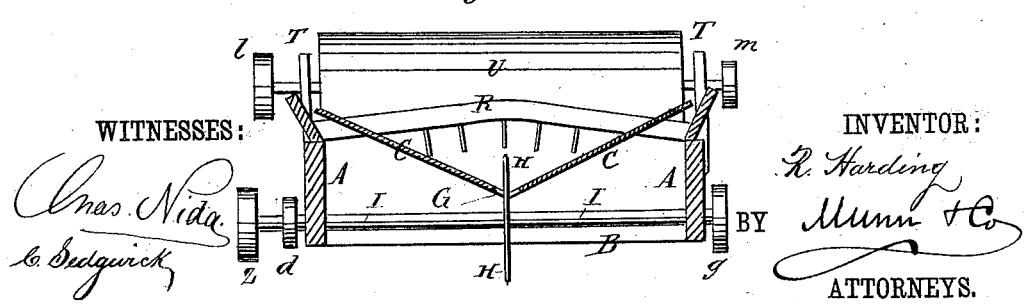

Figure 1 is a plan view of my improvement, parts being broken away. Fig. 2 is a longitudinal section of the same, taken through the broken line x x, Fig. 1. Fig. 3 is a sectional rear elevation of the same, taken through the line y y, Fig. 2.

The object of this invention is to facilitate the feeding of grain to thrashing-machines.

A represents the side-boards of the machine, which are connected by cross-bars B.

In the rear part of the machine is placed a V-shaped spout or feed-apron, C, the forward end of which is made pointed, and is hinged at its point or angle to a cross-bar of the frame A B. To the side parts of the rear end of the feed-spout C are hinged the upper end of two connecting-rods, D, the lower ends of which are hinged to cranks E, formed upon a shaft, F, journaled to the side-boards A, so that the said spout C will be agitated to feed the bundles forward by the revolution of the said shaft F.

Through the forward part of the angle of the feed-spout C is formed a slot, G, through which projects the upper part of the rotary cutter H. The cutter H is attached to a shaft, I, journaled to the side-boards A.

To the side-boards A, in front of the angular forward end of the feed-spout C, is journaled a spreader, J, which is made widest in the middle, and tapers toward each end, as shown in Fig. 1, so as to spread the grain after the band has been cut, and as it passes from the said feed-spout C.

In bearings in the side-boards A slides a bar, K, which is placed a little in front of the rotary spreader J, and is provided with teeth or shoulders, the teeth upon each side of the center of the said spreader inclining toward the adjacent side-board A. The vibrating spreader K is especially designed for use when thrashing tangled grain, to assist the rotary spreader J in spreading the grain after the bands have been cut.

From the spreaders J K the grain passes to the endless apron L, which has cross-bars M attached to it, and which passes around three or more rollers, N, journaled to the side-boards O, which are connected by cross-bars P and hinged at their rear ends to the side-boards A. The middle roller N is placed at a higher level than the end rollers, so that the rear part of the said endless apron L will incline upward, and the forward part incline downward, as shown in Fig. 2. The inclined parts of the endless apron L are supported from sagging by stationary aprons Q, attached to the cross-bars P. The grain as it passes up the inclined rear part of the endless apron L is further spread by the rake R, attached to the upper parts of the side-boards A.

The forward ends of the grain-stalks are bent downward, and the said grain is assisted in passing over the highest part of the endless apron L by the reel S, which is journaled to supports T, attached to the upper forward parts of the side-boards A. The reel S is covered by a hood, U, attached to the side-boards A, to prevent any kernals of grain beaten out by the reel S from flying away and being lost.

The forward end of the frame O P is supported by hooks V, hinged to the forward ends of the side-boards O, and hooking upon pins W or into staples attached to the side-boards A, so that the frames O P and its attachments can be lowered to give convenient access to the thrashing-cylinder when required.

The forward cross-bar, B, projects to overlap the ordinary feed-apron, X, of a thrashing-machine, as indicated in Fig. 2, to support the forward end of the machine and to cause the grain to pass directly from the feeder to the said apron.

The rear end of the machine is supported by legs Y, attached to the rear parts of the side-boards A.

The machine is designed to be driven from the driving mechanism of the thrasher by a belt passing around a pulley, Z, attached to the end of the cutter-shaft I. To the other end of the shaft I is attached a pulley, *a*, around which passes an endless belt, *b*. The belt *b* also passes around a pulley, *c*, attached to the crank-shaft F, so that the angular feed-spout C will be agitated from the cutter-shaft I. To the cutter-shaft I is also attached a third pulley, *d*, around which passes an endless belt, *e*. The belt *e* also passes around a pulley, *f*, attached to the journal of the spreader J, so that the said spreader will be rotated from the cutter-shaft I. To the cutter-shaft I is attached a fourth pulley, *g*, around which passes an endless belt, *h*. The belt *h* also passes around a pulley, *i*, attached to a journal of the rear roller, N, of the endless apron L, so that the said endless apron L will be driven from the cutter-shaft I. To the other journal of the roller N is attached a pulley, *j*, around which passes an endless belt, *k*. The belt *k* also passes around a pulley, *l*, attached to a journal of the reel S, to the other journal of which is attached a pulley, *m*. Around the pulley *m* passes a belt, *n*, which also passes around a pulley, *o*, placed upon a gudgeon attached to a side-board A. To the pulley *o* is attached or upon it is formed a beveled gear-wheel, *p*, the teeth of which mesh into the teeth of the beveled gear-wheel *q*, attached to the forward end of the short shaft *r*. The shaft *r* revolves in bearings in supports *s*, attached to the side-board A, and to the other end of the said shaft is attached a crank-wheel or crank, *t*, to the crank-pin of which is pivoted a short connecting-rod, *u*, the other end of which is pivoted to the projecting end of the vibrating spreader K.

By this construction, as the bundles are thrown into the angular feed-spout C they are carried forward to the cutter H, that cuts their bands. The grain is then spread by the spreaders J K, and is carried forward and delivered to the thrasher by the endless apron L M and the reel S.

Having thus described my invention, what I claim as new, and desire to secure by Letters Patent, is—

1. A band-cutter and feeder comprising an angular vibrating feed-spout, a rotary band-cutter, one or more grain-spreads, an endless apron, and a rotating reel, substantially as and for the purpose set forth.

2. In a band-cutter and feeder, the combination, with the frame A B and the rotating cutter H, of the angular feed-spout C, the connecting-rods D, the crank-shaft E F, and a driving mechanism, substantially as herein shown and described, whereby the bundles will be fed to the said cutter by the action of the spout, as set forth.

3. In a band-cutter and feeder, the combination, with the angular feed-spout C, the cutter H, and the endless apron L M, of the rotary spreader J, substantially as herein shown and described, whereby the grain will be spread as it passes from the feed-spout and cutter to the endless apron, as set forth.

4. In a combined band-cutter and feeder, the combination, with the frame A B, the rotary spreader J, and the endless apron L M, of the spreader K and mechanism for reciprocating it, substantially as herein shown and described, whereby the said rotary spreader will be assisted in spreading tangled grain, as set forth.

5. In a combined band-cutter and feeder, the combination, with the endless apron L M, having raised middle part, of the stationary rake R, the rotary reel S, and a driving mechanism, substantially as herein shown and described, whereby the said endless apron will be assisted in carrying the grain to the thrasher, as set forth.

RICHARD HARDING.

Witnesses:
JNO. W. MEEHORN,
CALVIN E. LEAP.